United States Patent [19]

Sheridon

[11] Patent Number: 5,389,945
[45] Date of Patent: Feb. 14, 1995

[54] WRITING SYSTEM INCLUDING PAPER-LIKE DIGITALLY ADDRESSED MEDIA AND ADDRESSING DEVICE THEREFOR

[75] Inventor: Nicholas K. Sheridon, Saratoga, Calif.

[73] Assignee: Xerox Corporation, Stamford, Conn.

[21] Appl. No.: 156,527

[22] Filed: Nov. 19, 1993

Related U.S. Application Data

[63] Continuation of Ser. No. 864,383, Apr. 6, 1992, abandoned, which is a continuation of Ser. No. 433,311, Nov. 8, 1989, abandoned.

[51] Int. Cl.⁶ .............................................. G09F 9/32
[52] U.S. Cl. ....................................... 345/85; 345/84; 345/107
[58] Field of Search ................... 365/127; 345/48, 84, 345/85, 86, 87, 108–111; 358/473

[56] References Cited

U.S. PATENT DOCUMENTS

| | | | |
|---|---|---|---|
| 3,460,276 | 8/1969 | Payne | 35/66 |
| 3,591,939 | 7/1971 | Payne et al. | 340/788 |
| 3,781,085 | 12/1973 | Leibowitz | 340/784 |
| 4,126,854 | 11/1978 | Sheridon | 340/787 |
| 4,143,103 | 3/1979 | Sheridon | 264/4 |
| 4,261,653 | 4/1981 | Goodrich | 350/362 |
| 4,368,952 | 1/1983 | Murata et al. | 350/362 |
| 4,402,062 | 8/1983 | Batchelder | 365/153 |
| 4,418,346 | 11/1983 | Batchelder | 340/787 |
| 4,438,160 | 3/1984 | Ishikawa et al. | 427/214 |
| 4,588,997 | 5/1986 | Tuan et al. | 346/76 PH |
| 4,679,096 | 7/1987 | Nagashima | 358/451 |
| 4,701,804 | 10/1987 | Toyoda et al. | 358/473 |
| 4,705,360 | 11/1987 | Funada et al. | 359/81 |
| 4,795,243 | 1/1989 | Suzuki | 350/362 |
| 4,801,932 | 1/1989 | Takubo et al. | 340/783 |
| 4,829,326 | 5/1989 | Emmett et al. | 346/157 |
| 4,905,090 | 2/1990 | Miyake | 358/472 |
| 4,948,232 | 8/1990 | Lange | 340/784 |
| 5,006,422 | 4/1991 | Sakurai et al. | 428/694 |
| 5,070,467 | 12/1991 | Todome | 340/706 |
| 5,073,770 | 12/1991 | Lowbner | 340/406 |

FOREIGN PATENT DOCUMENTS 63-303388  12/1988  Japan .

OTHER PUBLICATIONS

Chiang et al., A Stylus Writable Electrophoretic Display Device, SID 79 Digest, pp. 44–45.
IBM Technical Disclosure Bulletin, vol. 22, No. 1, Jun. 1979 (Runyan) "Electrostatic Liquid Display Devices".

*Primary Examiner*—Alvin E. Oberley
*Assistant Examiner*—Steven J. Saras

[57] ABSTRACT

An addressable display system including a paper-like sheet comprising a light transparent host layer loaded with a plurality of repositionable elements, the elements are movable from a first orientation in which they will present a first visual appearance, to a second orientation in which they will present a second visual appearance, and independent external addressing means relatively movable with respect to the display sheet for affecting the orientation of the repositionable elements.

11 Claims, 5 Drawing Sheets

WRITING SYSTEM INCLUDING PAPER-LIKE DIGITALLY ADDRESSED MEDIA AND ADDRESSING DEVICE THEREFOR

This is a continuation of application Ser. No. 07/864,383, now abandoned, which is a continuation of application Ser. No. 07/433,311, now abandoned.

FIELD OF THE INVENTION

This invention relates to a computer peripheral system for output display and for input scanning which is comparable in usage to paper. It comprises, in combination, an "electric paper" sheet display and relatively movable, external addressing and optical scanning members.

BACKGROUND OF THE INVENTION

The ubiquitous personal computer has placed constraints upon the manner in which its users conduct their work. Basically, it comprises a keyboard and a viewing screen with a capacity to display the equivalent of one or at most two printed sheets (often less). Because of the size of this hardware, the location of the work station may not always be optimal for both typing and reading. Usually, the CRT display screen is relegated to a more darkened portion of a work area in order to reduce glare and to increase viewing contrast, which is interfered with by ambient light.

The advent of portable computers has increased the flexibility of usage somewhat but screen visibility still presents a problem. Another attempt to make the computer hardware more environmentally compliant was the wireless keyboard which purported to allow the user to type at a remote location and in a more comfortable position when creating a document. When a document is longer than a page the user is confronted with the dilemma of either reading it on the screen display or printing it and reading the resultant paper version of the document. In order to obtain a paper print of a computer displayed document a print command directs the document to a printer dedicated to this function. In a typical office, and in many homes, a convenience copier also will be available.

Once a document has been printed, and retrieved from the printer, there is a tendency to read it in a variety of comfortable positions and under well lighted conditions in order to minimize bodily fatigue and eye strain. Often this reading function is accompanied by simultaneously making marginal notes and other annotations in order to clarify its content or inform another of one's contemporaneous thoughts. Printed paper has numerous other features, in addition to its transportability, which make it a more desirable medium for accessing information than a computer output display. Its "ambient light valve" behavior (i.e. the brighter the ambient light, the more easily it may be seen) enables the reader to ease eye strain simply by using a strong light source. A multi-page document may be easily shuffled from one page to another and several pages may be viewed simultaneously for comparing information appearing on different pages.

It is an object of the present invention to provide the computer work station user with a computer display that looks like paper, can be carried around like paper, can be written on like paper, can be copied like paper, has nearly archival memory like paper, and has a very low cost.

SUMMARY OF THE INVENTION

The present invention may be carried out, in one form, by providing an addressable display system including a paper-like sheet comprising a light transparent host layer loaded with a plurality of repositionable elements, the elements are movable from a first orientation in which they will present a first visual appearance, to a second orientation in which they will present a second visual appearance. Independent, external addressing means is provided to affect the orientation of the repositionable elements as it is moved relative to the sheet. The addressing means may take the form of an array of chargeable electrodes and the repositionable elements may take the form of substantially spherical balls, each ball having at least two dissimilar surfaces of contrasting colors and differential surface charges, each contained in and free to rotate within a substantially spherical cavity filled with a dielectric liquid.

BRIEF DESCRIPTION OF THE DRAWINGS

Other objects and further features and advantages of this invention will be apparent from the following, more particular, description considered together with the accompanying drawings, wherein.

DESCRIPTION OF THE ILLUSTRATION EMBODIMENTS

Figure 1:
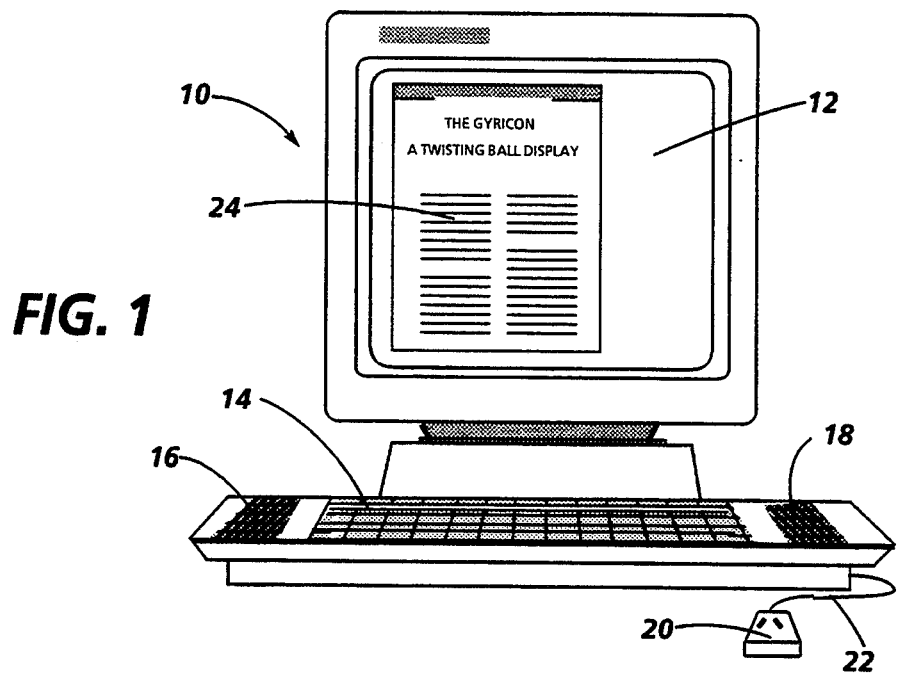
FIG. 1 is a front elevation view of a typical computer work station showing a document page on its display screen.

Turning to FIG. 1 there is shown a typical computer work station 10, such as the Xerox 6085 ®, having a CRT display 12, a QWERTY keyboard 14, auxiliary key panels 16 and 18, and a cursor and function controlling mouse 20 connected to the keyboard by a suitable cable 22. A processor (not shown) will interpret the key strokes and mouse movements and commands so that the user may compose documents, including alphanumeric and/or graphic representations, upon the CRT display or may receive such documents from others via an electronic mail system. A representative document 24, is illustrated. In accordance with known practice, the user may read the document directly upon the screen or may direct the document to a remote printer (not shown), from which he may retrieve a paper copy. The printer is a piece of document processing equipment which may cost as little as several hundred dollars to as much as several thousand dollars. If numerous copies of the document are desired, the user may initially print those number of copies, or he may take the printed copy to a copier to reproduce the initial paper copy. The latter course of action would prevail if the originally printed copy had annotations marked thereon and the user desires to capture the original as well as the appended information.

An alternative approach to the above-described procedure is made possible by the present invention. A paper-like display sheet 26 has most of the properties of paper. It need not be thicker than five or ten sheets of ordinary paper; it is flexible enough to roll up and carry in a shirt pocket; it exhibits ambient light valve behavior; and it may be written upon with a suitable erasable marker. If desired, the sheet may be made thicker to impart stiffness thereto. Additionally, and more importantly, marks may be created upon it or removed from it by the application of electric fields.

Figure 2:
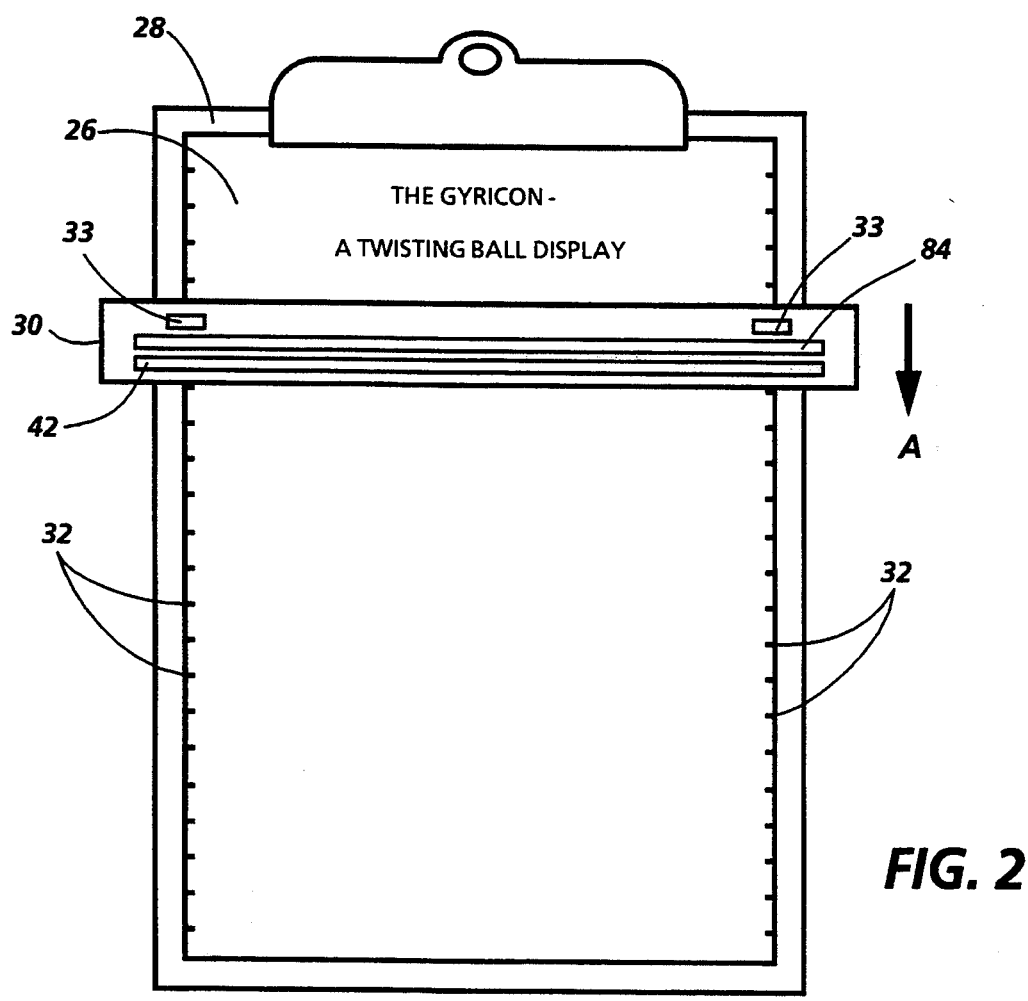
FIG. 2 is a top view of the paper-like computer output display sheet of the present invention shown being scanned by an addressing member.

In FIG. 2 there is shown the display sheet 26 supported upon a backing member 28, such as a clipboard, for providing a convenient support for the flaccid sheet during addressing. A hand held addressing wand 30, connected to the work station by any suitable wireless means, for example, infrared diodes, acoustics or radio, containing a linear array of addressing electrodes, is passed over the display sheet (as indicated by arrows A) for writing information transmitted from the remote work station onto the display sheet. An entire 8.5×11 inch surface may be written on in times as short as one second by drawing the wand over the length of the display sheet. This enables the user to be comfortably seated across the room from the work station. Registration marks 32 are provided on both sides of the display sheet for cooperating with suitable sensors (such as optical or magnetic) in the addressing wand in order to track wand speed and alignment. Thus, there is interaction between the wand, the work station and the display sheet so that correct information is transmitted and written. After the document has been written onto one or more display sheets, the user has several available options. He may read them, he may carry them away, or he may copy them onto paper at a copier. In the latter instance, the combination of my novel display system and the conventional copier is comparable to a very low cost printer, and obviates the need for that extra piece of equipment.

Figure 3:
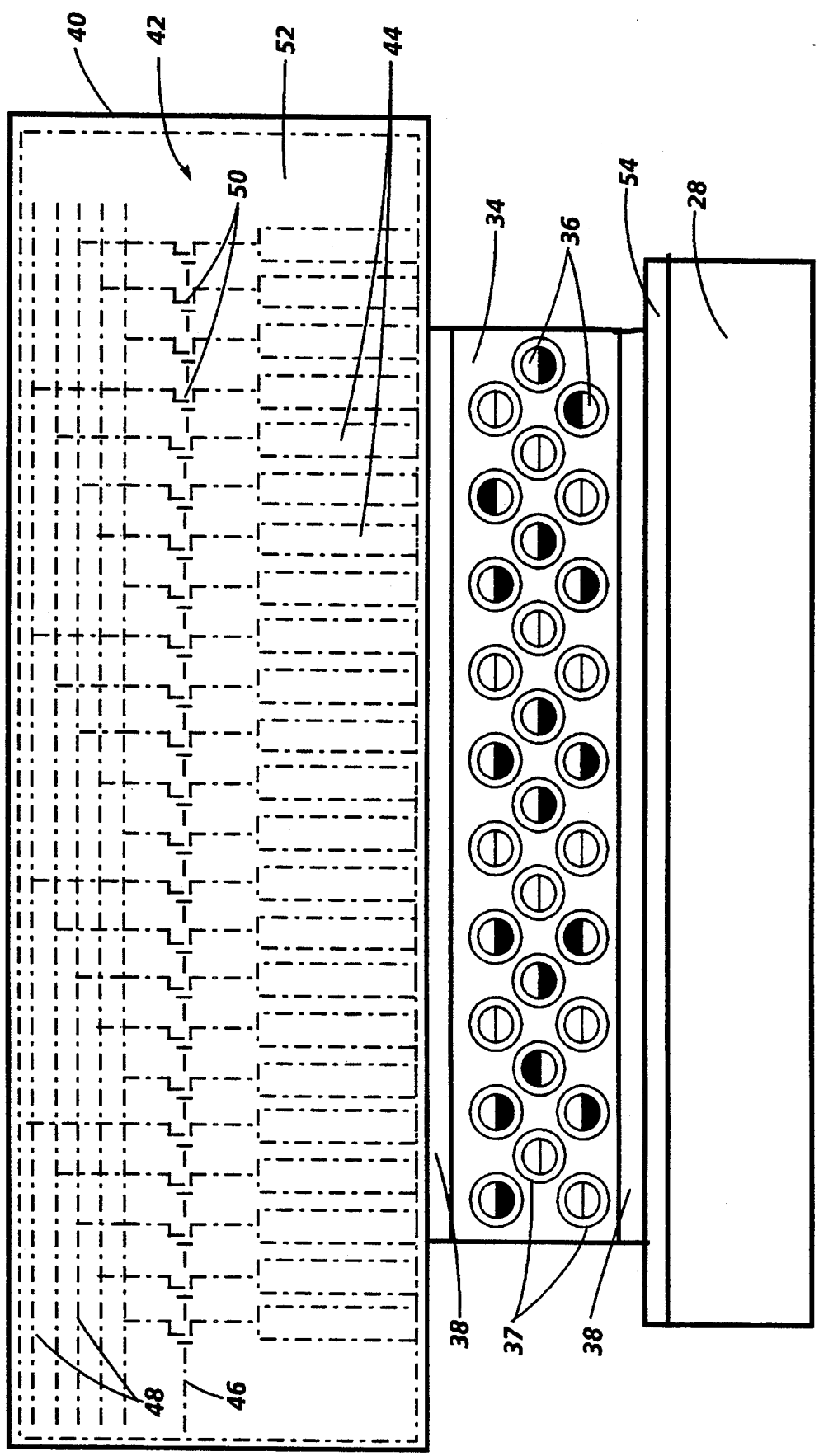
FIG. 3 is a representational sectional view through the paper-like display, its support, and the addressing wand, taken in the direction normal to the direction of movement between the display and the addressing member.

As can be seen in FIG. 3, the paper-like display sheet 26 comprises solely a host layer 34 loaded with small balls 36 rotatable in cavities 37 therein, and protective top and bottom layers 38 for imparting robust mechanical properties to the sheet. Alternatively, only the top layer may be protected, or the sheet may be fully encased in a protective sheath. It is an unelectroded form of the panel display fully described in my U.S. Pat. No. 4,126,854 and in an article co-authored by me entitled "The Gyricon—A Twisting Ball Display", published in the Proceedings of the S.I.D., Vol. 18/3&4, Third and Fourth Quarters 1977, both documents being incorporated by reference herein. The host layer may be an elastomer, such as silicone rubber, in sheet form, about 5 to 20 mils thick, having dispersed therein a high density of dielectric balls, each about 15 to 30 microns in diameter. Each ball is fabricated so that its hemispheres bear contrasting colors, preferably black on one side and white on the other, and will exhibit differential surface charges in an electrical field. Each ball is contained in a spherical cavity, slightly larger than the ball, with the space between the ball and the cavity filled with a dielectric liquid so that the ball is free to rotate therein. Once fabricated, it is possible to use the elastomer sheet by merely cutting it to a desired size with a pair of scissors. In order to protect the surface of the sheet for extended use, it is preferred to vacuum laminate it between two plastic sheets.

Upon the application of an electric field of a given polarity and of a potential higher than a threshold value, the balls will line up so that their black sides all face in one direction. When viewed from that direction, the display sheet will appear to be black. Conversely, reversing the polarity of the electric field will cause the balls to rotate 180° so that their white sides face in the viewing direction and the display will appear to be white. Display resolution with 25 micron diameter balls can be better than 300 lines/inch. Voltages on the order of 100 volts will cause balls of 25 micron diameter to rotate completely in about 3 milliseconds. The display sheet is capable of nonvolatile image storage, i.e. it will retain a pattern of ball orientation indefinitely, without the assistance of an electrical field. Vigorous shaking will not disturb the orientation, however folding or creasing the display sheet will. This nearly archival memory is attributed to a "soft latching" property whereby after the ball has rotated it lightly adheres to the adjacent wall of its cavity and will require a switching voltage greater than its threshold to detach it from its cavity wall.

As taught in my '854 patent, individual pixels, comprising one or more balls each, may be rotated by using a matrix of X and Y electrodes for accessing the display, in which top and bottom electrode plates bear orthogonally disposed electrodes. It is also well known to make active matrix addressing circuits for liquid crystal displays, comprising arrays of thin film transistors, one (at least) for each pixel on the display to be addressed. However, present commercial active matrix addressing plates are only a few square inches in area.

The paper-like addressable sheet 26 is unencumbered by an integral addressing array. As noted above, the 1-D array of modulating electrodes in the addressing wand 30 which is movable relative to the surface of the display sheet 26, supplants the integral 2-D addressing matrix in the device of the '854 patent. It comprises a housing 40 within which is positioned a large area array 42 including modulating electrodes 44, multiplexed address bus lines 46 and data bus lines 48, and high voltage transistors 50, all of which are thin film elements integrally fabricated upon a substrate 52. Such an array which is capable of a resolution of 300 lines/inch and producing addressing voltages of greater than 100 volts is disclosed in U.S. Pat. No. 4,588,997 (Tuan et al), entitled "Electrographic Writing Head". As the addressing wand is moved relative to the display sheet and the voltages on its individual modulating electrodes in array 42 are switched in accordance with the pixel information of the document to be written, appearing on a remote work station, an electrical field will be established between the electrodes and an electrically conductive ground plane 54 disposed on the opposite side of the display sheet. This conductive plane may be in the form of a conductive layer located on the backing member 28 (shown in FIG. 2) or it may be a thin conductive layer deposited, as by evaporation, directly upon the remote surface of the display sheet 26.

Figure 4:
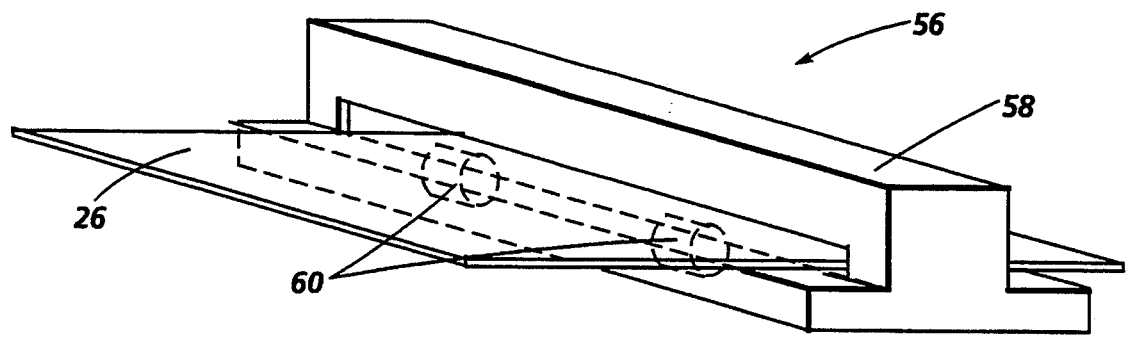
FIG. 4 is a perspective view of the paper-like computer output display of the present invention shown being scanned at an addressing station.

A convenience addressing station 56, for writing information onto unelectroded display sheets 26, is shown in FIG. 4. It includes a stationary housing 58, supporting a simple sheet feeding mechanism, represented by rollers 60, a large area scanning array similar to that described as 42 shown and described with respect to FIG. 3, and a suitable electrically conductive backing member (not shown) located opposite the scanning array. With this device, the user may feed sheets manually, or load several sheets onto the addressing station programmed for automatic feeding and writing. Because these display sheets are expected to be very low cost (perhaps a few dollars each) a typical user might have ten or twenty sheets for personal use and, in combination with the addressing station and a convenience copier, he has an extremely inexpensive desktop printer.

When a voltage greater than a threshold value (e.g. about 100 volts) is applied to a modulating electrode 44, the balls directly adjacent to it will be caused to detach from their cavity wall and then to rotate. After a short interval the balls will soft latch to the cavity wall and be semi-permanently positioned. With a 25 micron diameter ball and a modulating electrode voltage of 100 volts, it will take about 3 milliseconds for a ball to completely switch from black to white and to latch in place. This will constrain the array scanning speed.

Figure 5:
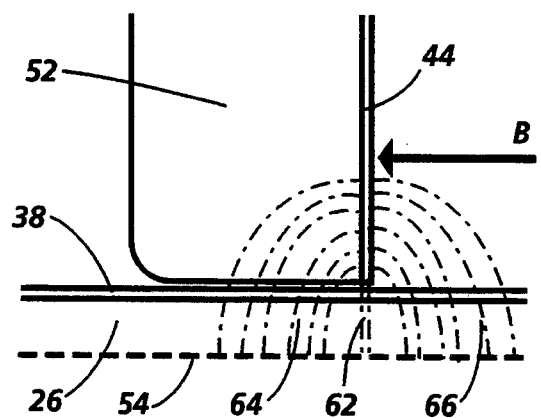
FIG. 5 is an sectional view of the addressing member, showing the electrical field lines emanating from the modulating electrode.

During writing the addressing array is moved in the direction indicated by arrow B, as shown in FIG. 5. The electric fields between it and ground plane 54 include the addressing electric field 62, downstream fringing fields 64 which act upon the soft-latched to-be-addressed balls, and upstream fringing fields 66 which act upon the just addressed and rotated balls. The downstream fringing fields 64 are of insufficient magnitude to dislodge the downstream balls, and have no effect. However, if the scanning speed is too fast and the just addressed balls have not yet soft latched, the upstream fringing fields 66 which spread laterally outwardly will tend to cause the balls to tilt toward the modulating electrode, resulting in a less than optimum contrast condition.

Figure 6:
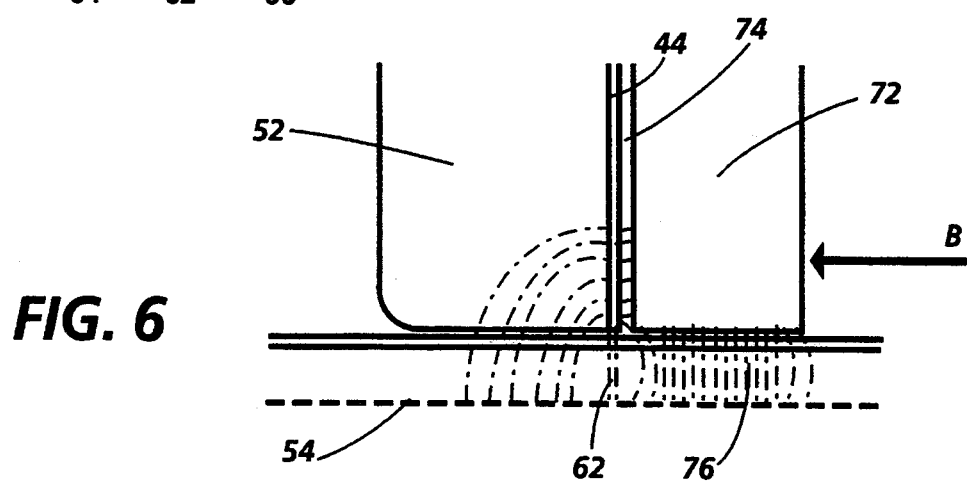
FIG. 6 is a sectional view, similar to FIG. 5, of an alternative embodiment of the addressing member, showing the electrical field lines emanating therefrom.
Figure 7:
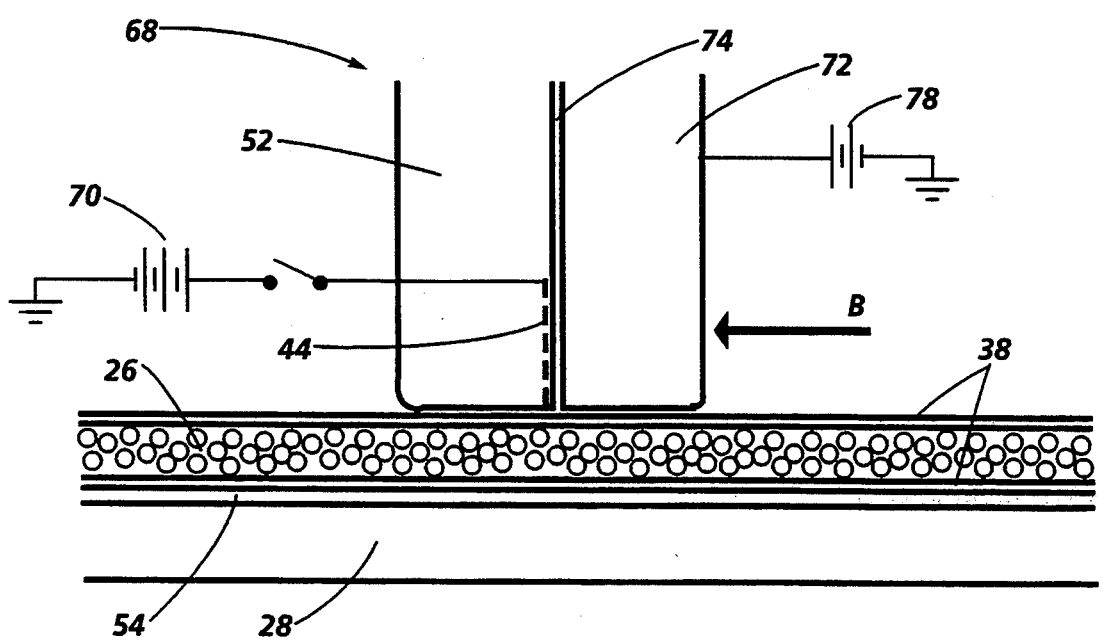
FIG. 7 is a sectional view showing the alternative embodiment of the addressing member together with the display sheet.

In order to prevent the deleterious action of the upstream fringing fields 66, a modified scanning array 68 is proposed. It includes a switchable source of threshold potential 70 connected to the modulating electrode 44, and a holding electrode 72, comprising a conductive plate (about 1 millimeter thick) separated from the modulating electrodes by a dielectric member 74 (about 25 microns thick), which may comprise an air gap or a solid dielectric shim. The electric fields 76 emanating from the modified scanning array are shown in FIG. 6, while its construction is more completely shown in FIG. 7. A subthreshold potential source 78 is connected to the holding electrode so that field lines extend directly from the holding electrode to the ground plane 54 in a normal direction and dominate over the upstream fringing fields from the modulating electrode. Therefore, its effect will be to hold any shifted pre-latched balls in a normal orientation for a long enough time to allow soft latching to occur. This will allow faster scanning because the addressing field need not be maintained in the vicinity of the balls until they have completely rotated, as long as the rotated balls are held in a normal field of lower magnitude for a considerable period of time after they have been rotated by the higher addressing field.

Figure 8:
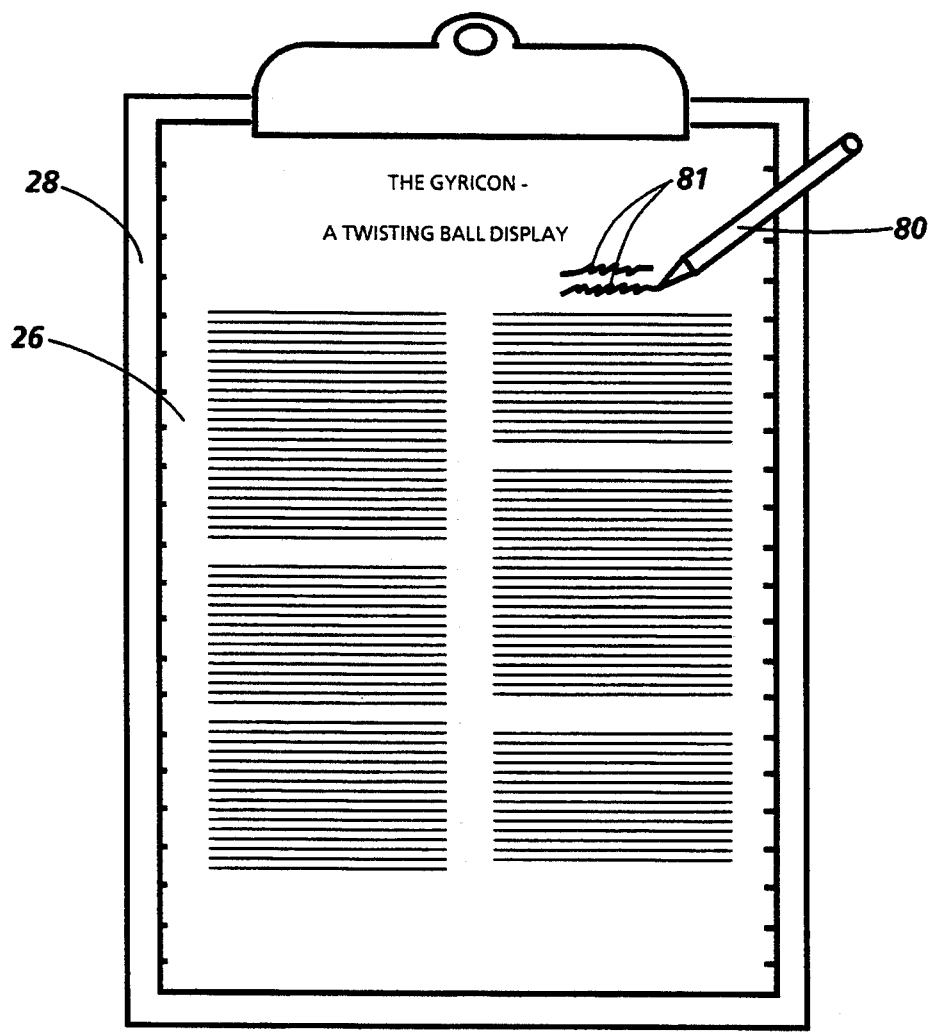
FIG. 8 is a top view of the paper-like computer output display sheet being written upon by a stylus.
Figure 9:
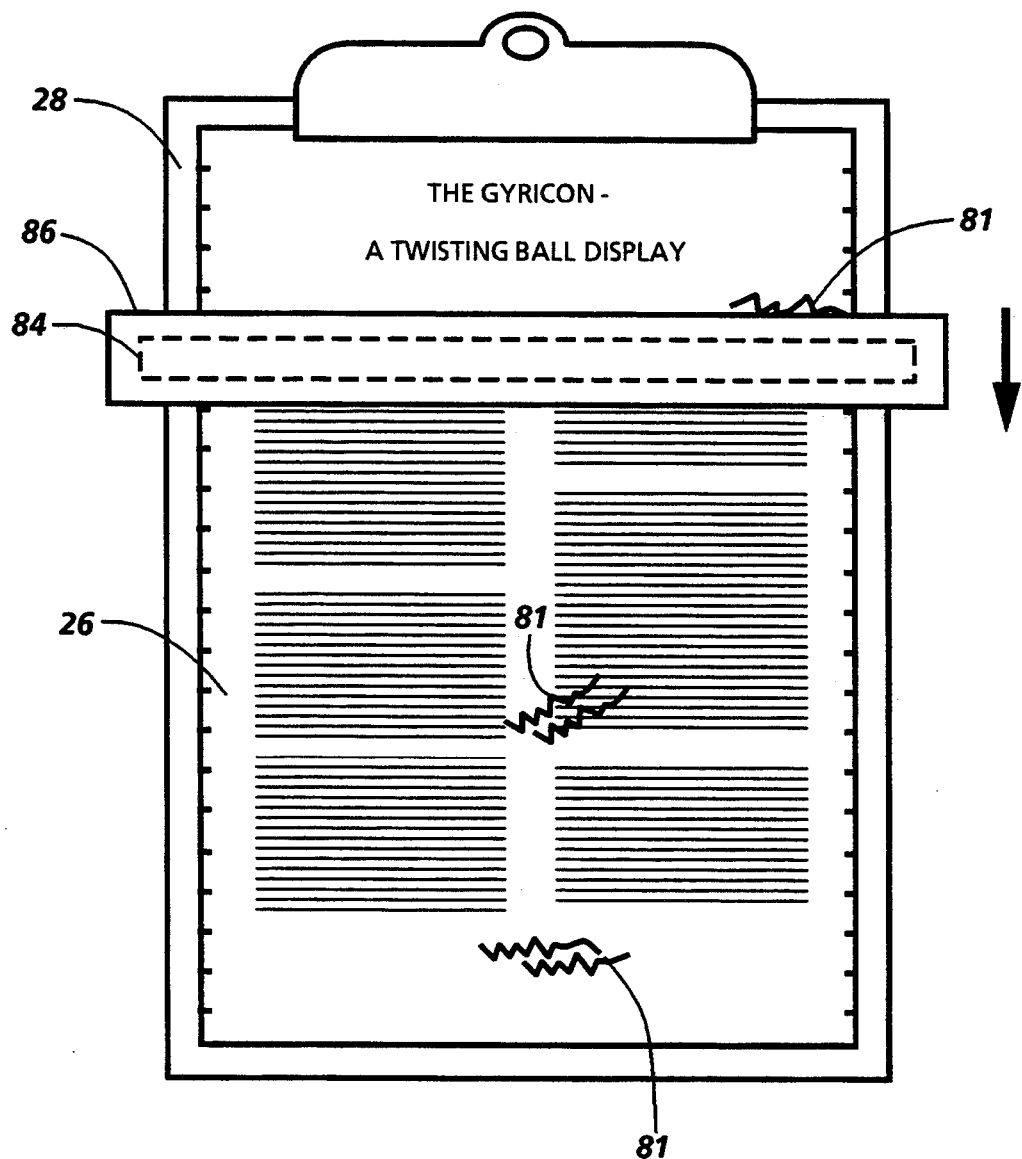
FIG. 9 is a top view of the paper-like computer output display sheet having electrically and non-electrically generated markings thereon, and a read bar for capturing the composite information.

With reference to FIG. 8 it can be seen that it is also possible to write upon the display sheet with an appropriate stylus 80 as indicated by markings 81 in order to annotate a document. This writing implement may be in the form of a battery operated pen having about 100 volts output in series with a very large resistor, which will write upon the sheet in a manner comparable to the addressing scanning array, i.e. by causing balls to rotate. Alternatively, an erasable grease-type marking pen may be used to write directly upon the surface of the host layer 34 or the protective layer 38. In order to capture these annotations, a conventional optical scanning array 84 may also be housed within the addressing wand 30 or addressing station 56, or in a separate read bar 86 as shown in FIG. 9. By moving the scanning array 84 relative to the display sheet, all the information on the sheet may be captured electrically for transmission back to the processor. This interactive system also may be used to input manual information such as drawings and sketches to the processor.

Although the present invention has been described with reference to a rotating ball display sheet alterable by electrical signals, it is contemplated that other driving signals, such as magnetic, could be used and that other repositionable appearance changing elements are possible within the purview of this invention. Therefore, it should be understood that the present disclosure has been made only by way of example and numerous changes in details of construction and the combination and arrangement of elements may be resorted to without departing from the true spirit and scope of the invention as hereinafter claimed.

What is claimed is:

1. A writing system including a reusable planar writing sheet for use with an addressing device which is capable of imposing human perceivable information on said writing sheet, said writing sheet and said addressing device being normally independent and remote from one another when said writing sheet is not being addressed, and wherein said writing sheet and said addressing device are brought into proximity with and are moved relative to one another for imposing information on said writing sheet, said writing sheet has a surface upon which information can be written and erased, exhibits ambient light valve behavior, has the ability to retain imposed information in the absence of an external retaining ibrce, and has the capability of being rolled into tubular form about any axis lying in the plane of said sheet, said writing sheet further comprises a light transparent host layer, a plurality of reorientable substantially spherical balls having at least two dissimilar surface portions of contrasting colors and different surface charges, each of said balls being contained, and free to rotate, within a cavity in said host layer, said reorientable balls being movable from a fixed and stable first orientation, in which they will present a first visual appearance, to a fixed and stable second orientation, in which they will present a second visual appearance, said addressing device includes an array of electrically chargeable electrodes for dislodging said balls from one fixed and stable orientation and initiating rotation thereof, and a holding electrode for completing rotation of said balls to the other fixed and stable orientation.

2. The writing system as defined in claim 1 wherein each of said electrically chargeable electrodes in said array is switchably connected to a first potential source, the magnitude of said first potential being sufficient to dislodge said balls from one fixed and stable orientation and to initiate rotation thereof, and said holding electrode is connected to a second potential source, the magnitude of said second potential being insufficient to dislodge said balls from a fixed and stable orientation, but being sufficient to cause said dislodged balls to rotate to completion and to lodge in said other fixed and stable orientation.

3. The writing system as defined in claim 1 wherein said holding electrode is coextensive with said array of electrically chargeable electrodes and is positioned to trail said array as said writing sheet and said addressing device are moved relative to one another.

4. The writing system as defined in claim 3 wherein said holding electrode is dimensioned relative to said array of electrically chargeable electrodes so that said balls will be under the influence of said holding electrode for a longer period of time than they are under the influence of said chargeable electrodes.

5. The writing system as defined in claim 3 wherein said holding electrode is separated from said array of electrically chargeable electrodes by a dielectric member.

6. The writing system as defined in claim 2 wherein the sign of said first potential source and said second potential source is the same.

7. The writing system as defined in claim 1 wherein said writing sheet includes registration features thereon and said addressing device includes a sensing device capable of identifying said registration features and generating signals in response thereto.

8. The writing system as defined in claim 7 further including a reading device housed together with said addressing device.

9. The writing system as defined in claim 8 wherein said reading device comprises an optical scanning array substantially coextensive with said array of electrically chargeable electrodes.

10. The writing system as defined in claim 7 further including a reading device being normally independent and remote from said writing sheet and said addressing device.

11. The writing system as defined in claim 10 wherein said reading device comprises an optical scanning array substantially coextensive with said array of electrically chargeable electrodes.

* * * * *